(12) United States Patent
Fleischmann et al.

(10) Patent No.: US 11,585,431 B2
(45) Date of Patent: Feb. 21, 2023

(54) TRANSMISSION AND MOTOR VEHICLE

(71) Applicant: ZF Friedrichshafen AG, Friedrichshafen (DE)

(72) Inventors: Andreas Fleischmann, Ludwigsfelde (DE); Matthias Retsch, Brandenburg (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 228 days.

(21) Appl. No.: 16/322,306

(22) PCT Filed: Aug. 2, 2017

(86) PCT No.: PCT/EP2017/069502
§ 371 (c)(1),
(2) Date: Jan. 31, 2019

(87) PCT Pub. No.: WO2018/029054
PCT Pub. Date: Feb. 15, 2018

(65) Prior Publication Data
US 2020/0182347 A1    Jun. 11, 2020

(30) Foreign Application Priority Data

Aug. 9, 2016   (DE) .................... 10 2016 214 754.4

(51) Int. Cl.
*F16H 57/04*    (2010.01)
(52) U.S. Cl.
CPC ..... *F16H 57/0447* (2013.01); *F16H 57/0436* (2013.01); *F16H 57/0452* (2013.01); *F16H 57/0493* (2013.01)

(58) Field of Classification Search
CPC ............. F16H 57/0447; F16H 57/0436; F16H 57/0452; F16H 57/0493; F16H 57/045
See application file for complete search history.

(56) References Cited

U.S. PATENT DOCUMENTS

| 4,169,519 A | * | 10/1979 | Hirt ...................... F16H 57/0456 |
| | | | 184/6.12 |
| 4,658,665 A | * | 4/1987 | Strinzel ............... F16H 57/0442 |
| | | | 184/6.12 |
| 5,101,936 A | * | 4/1992 | Paredes .................... F01M 1/12 |
| | | | 123/196 S |

(Continued)

FOREIGN PATENT DOCUMENTS

| DE | 3316117 A1 | 11/1983 |
| DE | 102005006811 A1 | 9/2005 |

(Continued)

OTHER PUBLICATIONS

DE102011082185—Machine translation (Year: 2011).*

(Continued)

*Primary Examiner* — Michael A Riegelman
(74) *Attorney, Agent, or Firm* — Dority & Manning, P.A.

(57) ABSTRACT

A transmission includes a first oil reservoir and a second oil reservoir. The first oil reservoir, in an installed position, lies underneath the second oil reservoir. The first oil reservoir and the second oil reservoir are connected via a connection line. The connection line is configured to open or close depending on an oil level in the first oil reservoir. A related motor vehicle is also provided.

13 Claims, 3 Drawing Sheets

(56) References Cited

U.S. PATENT DOCUMENTS

| | | | | |
|---|---|---|---|---|
| 5,121,815 | A | * | 6/1992 | Francois .............. B64C 27/12 184/6.12 |
| 7,112,156 | B2 | * | 9/2006 | Maguire ............ F16H 57/0447 475/127 |
| 2008/0169030 | A1 | * | 7/2008 | Schoenek .......... F16H 57/0447 137/434 |
| 2010/0319486 | A1 | * | 12/2010 | Kawamoto ......... F16H 57/0494 74/665 L |
| 2014/0026988 | A1 | * | 1/2014 | Peterson ............ F16H 57/0443 137/544 |
| 2014/0172250 | A1 | * | 6/2014 | Tamai ................ F16H 57/0442 701/51 |
| 2015/0345616 | A1 | * | 12/2015 | Schweiher ......... F16H 57/0446 184/6.12 |
| 2020/0182347 | A1 | * | 6/2020 | Fleischmann ...... F16H 57/0436 |

FOREIGN PATENT DOCUMENTS

| | | |
|---|---|---|
| DE | 102008003611 A1 | 9/2008 |
| DE | 102011082185 A1 | 3/2013 |
| DE | 102013214366 A1 | 1/2014 |
| DE | 102013221584 A1 | 4/2015 |
| DE | 102013222983 A1 | 5/2015 |
| DE | 102014107659 A1 | 12/2015 |
| DE | 102014013580 A1 | 3/2016 |
| JP | 2008039072 A | 2/2008 |
| WO | WO 2015/058900 | 4/2015 |

OTHER PUBLICATIONS

DE102013221584—Machine translation (Year: 2013).*
German Search Report DE102016214754.4 dated Mar. 3, 2017. (7 pages).
International Search Report (English Translation) PCT/EP2017/069502, dated Oct. 23, 2017. (3 pages).

* cited by examiner

TRANSMISSION AND MOTOR VEHICLE

FIELD OF THE INVENTION

The invention relates generally to a transmission having a first oil reservoir and a second oil reservoir. The first oil reservoir, in the installed position, lies underneath the second oil reservoir.

BACKGROUND

Transmissions require oil in order to implement the lubrication of various transmission components and to cool the transmission.

A first oil reservoir is located at the bottom of the transmission in this case. This first oil reservoir is also referred to as an oil sump.

In addition, it is known to also situate a second oil reservoir in the transmission.

SUMMARY OF THE INVENTION

Example aspects of the present invention provide a transmission, in the case of which the oil level in the first oil reservoir is easily and cost-effectively regulatable.

In a transmission of the type mentioned at the outset, the first oil reservoir and the second oil reservoir are connected with the aid of a connection line, and the connection line is openable or closable depending on the oil level in the first oil reservoir.

The second oil reservoir is utilized for holding the oil level in the first oil reservoir constant and, thus, to make it possible to check the oil level in the first oil reservoir.

In order to hold the oil level in the first oil reservoir at a maximum level, the connection line is openable when the oil level in the first oil reservoir falls below a predefined level. Otherwise, the connection line is closed. Since a steady outflow from the first oil reservoir takes place anyway with the aid of a pump, it can be ensured, in a simple way, that a predefined oil level is maintained in the first oil reservoir. In this case, the oil pump draws oil from the first oil reservoir, which is replenished from the second oil reservoir.

Advantageously, the connection line may include a valve arrangement in order to be opened. The connection line may also be closed again with the aid of the valve arrangement, of course.

Preferably, the valve arrangement is designed to be passive. This means, the valve arrangement operates purely mechanically-hydraulically, without electrical components.

Advantageously, the valve arrangement may include a float which floats in the oil of the first oil reservoir. The float is a fill level sensor of the first oil reservoir.

In addition, the valve arrangement may include a plug which covers an opening in the connection line. Therefore, the valve arrangement is very simply designed. Namely, the valve arrangement may include an opening in the connection line and of a cover of the opening in the form of the plug. The plug may have any shape, in principle. It is important that the plug closes the opening in an oil-tight manner. In this case, "oil-tight" also merely means that the opening is closed in such a way that the oil level cannot substantially increase after the opening has been closed. Small quantities of dripping or running oil are irrelevant in this case, since the first oil reservoir has a cross-sectional area of approximately an eighth of a square meter (⅛ m²) and, therefore, volumes of dripping or running oil are irrelevant.

Advantageously, the float and the plug may be rigidly connected. In this case, the fill-level sensing may be transmitted directly to the cover of the opening, namely the plug, with the aid of the float.

Advantageously, the opening may be situated on the underside of the connection line. In this arrangement, a change of the fill level may be particularly easily transmitted onto the plug.

Alternatively, the opening may also be situated on the side of the connection line. The opening is then opened or closed via a tilting movement of the plug. Therefore, the plug does not need to be inserted straight into the opening and removed straight from the opening. It is also possible that the opening is closed by way of tilting movements of the plug.

Preferably, the transmission may include a pump and/or passive oil collection elements which conduct oil into the second oil reservoir. The central idea in this case is to conduct oil spray into the second oil reservoir with the aid of collection surfaces and to store the oil in the second oil reservoir until the oil is conducted into the first oil reservoir via the connection line.

Advantageously, the transmission may be designed as a countershaft transmission. In particular, the transmission may be designed as a dual clutch transmission. With respect to these transmissions in particular, it is advantageous when the oil level for closing the connection line is selected in such a way that the gearwheels of the transmission lie above the oil in the first oil reservoir. As a result, drag torques may be reduced, whereby the efficiency of the torque transmission may be increased.

The invention also relates to a motor vehicle having a transmission. The motor vehicle is distinguished by the fact that the transmission is designed as described above.

BRIEF DESCRIPTION OF THE DRAWINGS

Further advantages, features, and details of the invention result from the following description of exemplary embodiments and figures. Wherein.

DETAILED DESCRIPTION

Figure 1:
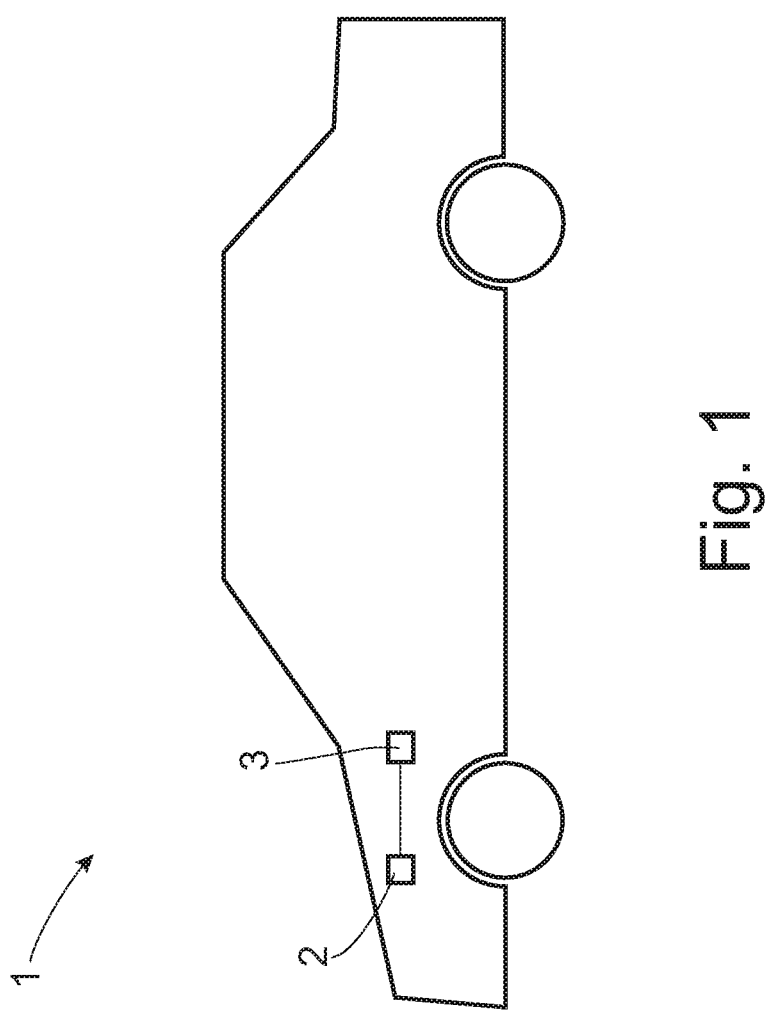
FIG. 1 shows a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a motor vehicle 1 with a drive unit 2 and a transmission 3. The drive unit 2 may be designed as an electric motor. In this case, the transmission 3 is utilized for enabling the electric motor to be operated at constantly high rotational speeds. Alternatively, the drive unit 2 is an internal combustion engine.

The transmission 3 is represented in greater detail in the following figures.

Figure 2:
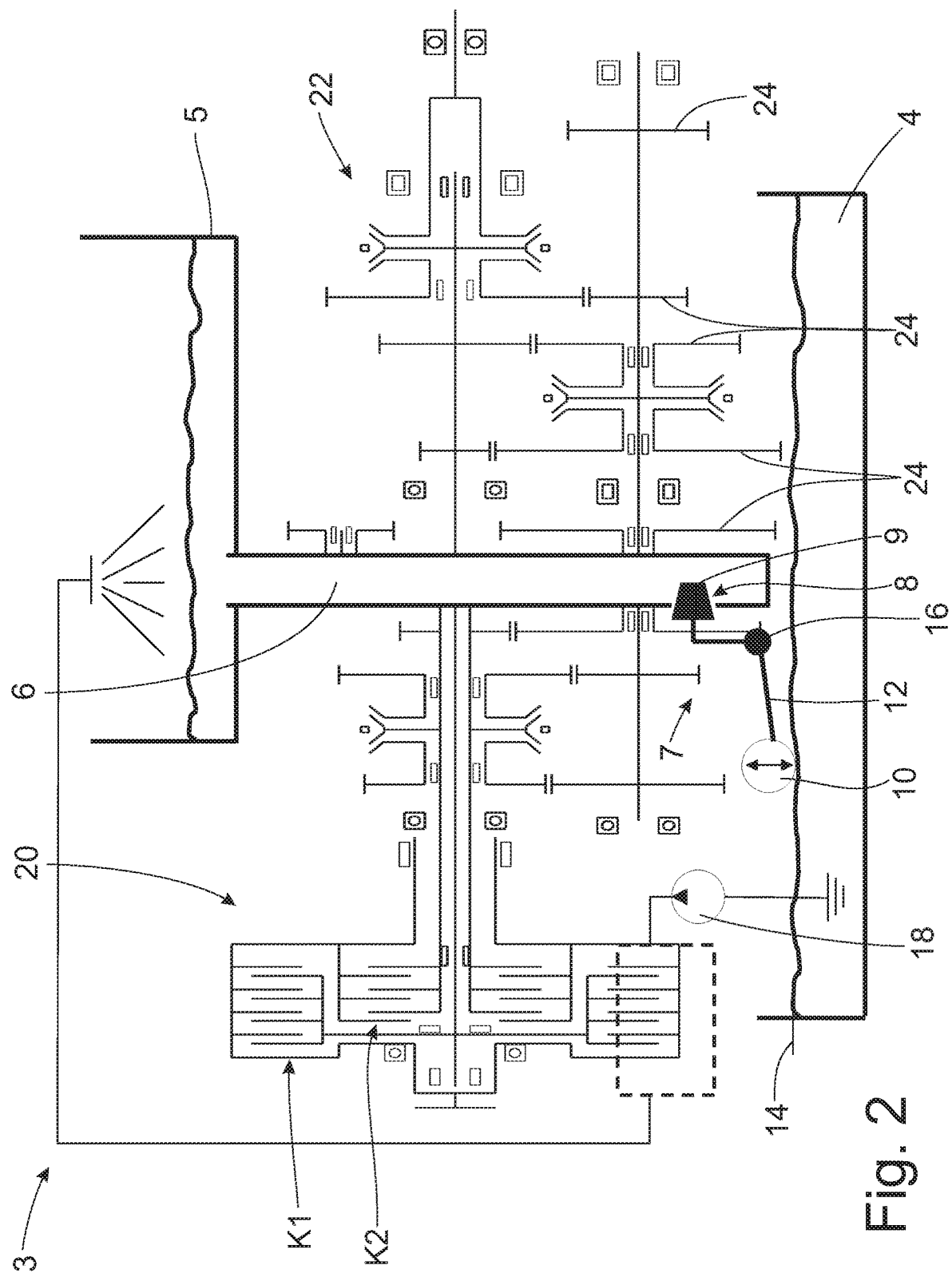
FIG. 2 shows a first embodiment of a transmission.

FIG. 2 shows a first embodiment of the transmission 3. In this case, a first oil reservoir 4 is located at the bottom of the transmission 3 and a second oil reservoir 5 is located thereabove. The first oil reservoir 4 and the second oil reservoir 5 are connected by a connection line 6. The connection line 6 includes a valve arrangement 7, with the aid of which the connection line 6 is openable and closable.

The valve arrangement 7 includes, in a first embodiment, an opening 8 on the side of the connection line 6, a plug 9 for closing the opening 8, a float 10, as well as a rigid linkage 12 between the float 10 and the plug 9. The float 10 senses the oil level 14 of the first oil reservoir 4.

If the oil level 14 falls below a certain level, the plug 9 tilts, whereby oil from the connection line 6 enters the first oil reservoir 4. This continues until the oil level 14 in the first oil reservoir 4 has reached a certain level once again. For this purpose, it is useful when the linkage 12 includes a rotation point 16 which is fixed with respect to the connection line. The rotation point 16 does not need to be fixed on the connection line 6. Rather, the rotation point 16 merely needs to be fixed so as to be rotatable with respect to the connection line 6.

An oil pump 18 draws oil from the first oil reservoir 4 in order to lubricate the clutches K1 and K2 of a dual clutch arrangement 20. The gear set 22 of the transmission 3, which is designed as a dual clutch transmission, is clearly obvious upon consideration of FIG. 2, but is not explained in detail in the following. It is merely pointed out that the gearwheels 24 always lie above the oil level 14 due to the described embodiments of the oil reservoirs 4 and 5. In this case, the valve arrangement is designed in such a way that the maximum oil level is below the lower edge of the lowermost gearwheel 24.

Figure 3:
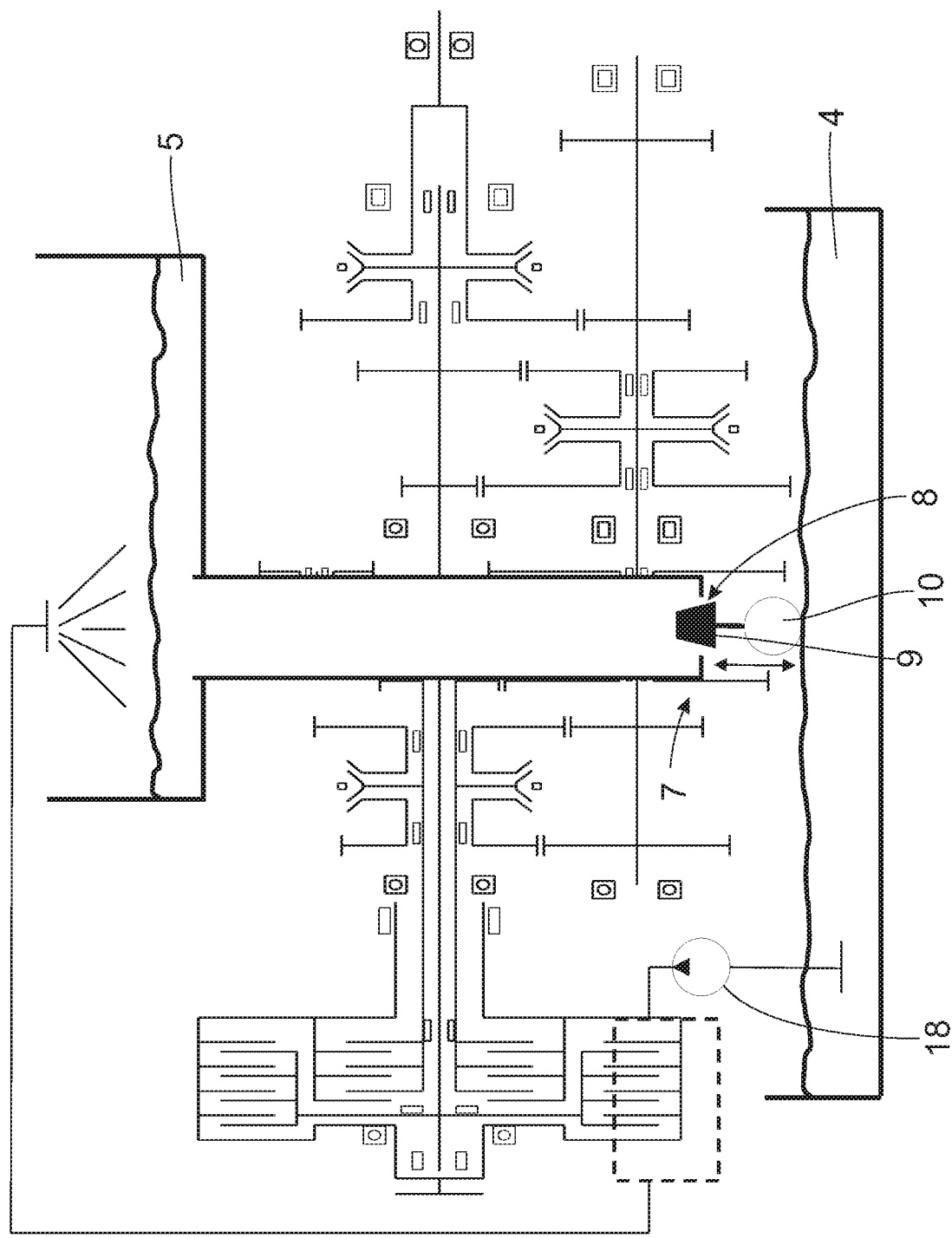
FIG. 3 shows a second embodiment of a transmission.

FIG. 3 shows an alternative embodiment of the valve arrangement 7. In this case, the opening 8 is located on the underside of the connection line 6. As a result, the valve arrangement 8 also no longer requires a rotation point. For the purpose of guiding the plug 9 and the float 10, the plug 9 may extend a great deal further into the interior space of the connection line 6 as compared to the representation in FIG. 2, and so the plug 9 as well as the float 10 are guided. In this way, sideways motions of the float 10 may be avoided.

Modifications and variations can be made to the embodiments illustrated or described herein without departing from the scope and spirit of the invention as set forth in the appended claims.

REFERENCE CHARACTERS 1 motor vehicle
2 drive unit
3 transmission
4 first oil reservoir
5 second oil reservoir
6 connection line
7 valve arrangement
8 opening
9 plug
10 float
12 linkage
14 oil level
16 rotation point
18 oil pump
20 dual clutch arrangement
22 gear set
24 gearwheel
K1 clutch
K2 clutch

The invention claimed is:

1. A transmission (3), comprising:
a plurality of gearwheels (24) arranged on a plurality of shafts;
a first oil reservoir (4);
a second oil reservoir (5), the first oil reservoir (4) installed beneath the second oil reservoir (5); and
a connection line (6), the first oil reservoir (4) and the second oil reservoir (5) connectable through the connection line (6), the connection line (6) comprising a valve (7) configured to open or close depending on an oil level (14) in the first oil reservoir (4),
wherein the gearwheels (24) and the shafts are positioned directly above the first oil reservoir (4) such that the first oil reservoir (4) forms an oil sump for oil from the gearwheels (24) and the shafts, and
wherein the valve (7) is configured to maintain the oil level (14) in the first oil reservoir (4) between a minimum level and a maximum level, and the valve (7) is configured to open when the oil level (14) in the first oil reservoir (4) is less than the maximum level.

2. The transmission of claim 1, wherein the connection line (6) is open when the oil level (14) in the first oil reservoir (4) falls below a predefined level.

3. The transmission of claim 1, wherein the valve (7) comprises a float (10) which floats in the oil of the first oil reservoir (4).

4. The transmission of claim 3, wherein the valve (7) comprises a plug (9) which covers an opening (8) in the connection line (6).

5. The transmission of claim 4, wherein the float (10) and the plug (9) are rigidly connected.

6. The transmission of claim 4, wherein the opening (8) is disposed on a bottommost portion of the connection line (6).

7. The transmission of claim 4, wherein the opening (8) is disposed on a side of the connection line (6) above a bottommost portion of the connection line (6).

8. The transmission of claim 1, further comprising one or both of a pump (18) and a passive oil collector, the pump (18) and the passive oil collector configured to conduct oil into the second oil reservoir (5).

9. The transmission of claim 1, wherein the transmission (3) is a countershaft transmission.

10. The transmission of claim 1, wherein the transmission (3) is a dual clutch transmission.

11. The transmission of claim 1, wherein the connection line (6) is configured to close when the oil level (14) is below the shafts and the gearwheels (24) such that the shafts and gearwheels (24) are positioned above the oil in the first oil reservoir (4).

12. A motor vehicle (1), comprising a transmission (3) having a plurality of gearwheels (24) arranged on a plurality of shafts, a first oil reservoir (4), a second oil reservoir (5) and a connection line (6), the first oil reservoir (4) installed beneath the second oil reservoir (5), the first oil reservoir (4) and the second oil reservoir (5) connectable through the connection line (6), the-a valve (7) configured to open or close depending on an oil level (14) in the first oil reservoir (4),
wherein the gearwheels (24) and the shafts are positioned directly above the first oil reservoir (4) such that the first oil reservoir (4) forms an oil sump for oil from the gearwheels (24) and the shafts, and
wherein the valve (7) is configured to maintain the oil level (14) in the first oil reservoir (4) between a minimum level and a maximum level, and the valve (7)

is configured to open when the oil level (14) in the first oil reservoir (4) is less than the maximum level.

13. A transmission (3), comprising:

a plurality of gearwheels (24) arranged on a plurality of shafts;

a first oil reservoir (4);

a second oil reservoir (5) positioned above the first oil reservoir (4); and a connection line (6) comprising a valve (7) configured to open and close depending on an oil level (14) in the first oil reservoir (4), the connection line (6) placing the second oil reservoir (5) in fluid communication with the first oil reservoir (4) such that oil from the second oil reservoir (5) is flowable into the first oil reservoir (4) through the connection line (6) when the valve (7) is open due to the oil level (14) in the first oil reservoir (4) being between a minimum level and a maximum level, the valve (7) obstructing the oil from the second oil reservoir (5) from flowing into the first oil reservoir (4) through the connection line (6) when the valve (7) is closed, wherein the gearwheels (24) and the shafts are positioned directly above the first oil reservoir (4) such that the first oil reservoir (4) forms an oil sump for oil from the gearwheels (24) and the shafts, and wherein the valve (7) is configured to maintain the oil level (14) in the first oil reservoir (4) between the minimum level and the maximum level, and the valve (7) is configured to open when the oil level (14) in the first oil reservoir (4) is less than the maximum level.

\* \* \* \* \*